(12) United States Patent
Zaldivar et al.

(10) Patent No.: US 9,956,587 B2
(45) Date of Patent: May 1, 2018

(54) FABRICATION ASSEMBLY AND METHODS FOR FABRICATING COMPOSITE MIRROR OBJECTS

(71) Applicant: The Aerospace Corporation, El Segundo, CA (US)

(72) Inventors: Rafael J. Zaldivar, Huntington Beach, CA (US); Geena L. Ferrelli, Los Angeles, CA (US); Hyun I. Kim, Brea, CA (US); Dhruv N. Patel, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days. days.

(21) Appl. No.: 15/250,823

(22) Filed: Aug. 29, 2016

(65) Prior Publication Data
US 2018/0056327 A1  Mar. 1, 2018

(51) Int. Cl.
*B05D 3/06* (2006.01)
*B05C 9/02* (2006.01)
*B05D 3/14* (2006.01)

(52) U.S. Cl.
CPC .......... *B05D 3/06* (2013.01); *B05C 9/02* (2013.01); *B05D 3/145* (2013.01)

(58) Field of Classification Search
None
See application file for complete search history.

(56) References Cited

U.S. PATENT DOCUMENTS

| | | | | |
|---|---|---|---|---|
| 5,380,349 A * | 1/1995 | Taniguchi | ............. | C03B 11/084 |
| | | | | 106/38.28 |
| 5,855,966 A | 1/1999 | Richards | | |
| 7,001,853 B1 * | 2/2006 | Brown | ............. | B01L 3/502707 |
| | | | | 430/269 |
| 8,496,863 B2 | 7/2013 | Hoghoj et al. | | |
| 9,041,135 B2 * | 5/2015 | Janson | ................. | G01S 3/7861 |
| | | | | 257/435 |
| 2003/0077399 A1 * | 4/2003 | Potyrailo | ............. | B01J 19/0046 |
| | | | | 427/532 |
| 2005/0019504 A1 * | 1/2005 | Bi | ........................ | C23C 16/401 |
| | | | | 427/596 |
| 2006/0134347 A1 * | 6/2006 | Chiruvolu | ................ | C23C 8/00 |
| | | | | 427/585 |
| 2007/0035068 A1 * | 2/2007 | Hoghoj | ............... | B29C 33/3878 |
| | | | | 264/338 |

(Continued)

*Primary Examiner* — Jethro M Pence

(57) ABSTRACT

A fabrication assembly comprises an apparatus that receives a composite substrate and a glass substrate having a surface with a release coating layer. A resin layer is deposited between the composite and glass substrates such that a first portion of the resin layer is positioned adjacent to a surface of the composite substrate and a second portion of the resin layer is positioned adjacent to the surface with the release coating layer to prevent aperture(s) from forming. A curing of the resin layer is conducted using electromagnetic radiation. A post-processing chamber receives the resin layer positioned between the composite substrate and the glass substrate and conducts another curing of the resin layer. The resin layer and the composite substrate are released from the glass substrate. Another deposition apparatus receives the resin layer and the composite substrate. A metallic coating is deposited to form a composite mirror object.

11 Claims, 3 Drawing Sheets

(56) References Cited

U.S. PATENT DOCUMENTS

| | | | |
|---|---|---|---|
| 2007/0087131 A1* | 4/2007 | Hutchinson | C08J 7/123 427/533 |
| 2009/0139450 A1* | 6/2009 | Ogura | H01L 21/67173 118/600 |
| 2009/0165711 A1* | 7/2009 | Ogura | H01L 21/6715 118/600 |
| 2009/0258048 A1 | 10/2009 | Ward et al. | |
| 2012/0082851 A1* | 4/2012 | Zaldivar | B32B 27/08 428/409 |
| 2014/0209153 A1* | 7/2014 | Kwon | C08J 7/042 136/251 |

* cited by examiner

FABRICATION ASSEMBLY AND METHODS FOR FABRICATING COMPOSITE MIRROR OBJECTS

STATEMENT OF GOVERNMENT INTEREST

This invention was made with government support under Contract No. FA8802-14-C-0001 awarded by the Department of the United States Air Force. The government has certain rights in this invention.

BACKGROUND

The field of the invention relates generally to fabrication assemblies and, more particularly, to fabrication assemblies configured to construct composite mirror objects.

At least some known visual devices, such as telescopes, include components, such as mirrors. The manufacturing of mirrors used in various devices, such as telescopes, includes the fabrication of replicated mirrors. At least some known methods and techniques used for the fabrication of replicated mirrors involves the positioning of an uncured resin between a glass mandrel, such as a high quality mandrel, and a pre-manufactured composite substrate. In some circumstances, the resin is cured and the surface of the mandrel is replicated, while being bonded to the composite surface. The resulting replica surface is coated with a reflective metal. It is rare that replicated resin surfaces are the exact same copy as the master mandrel. As such, the method requires a series of secondary polishing procedures, such as ion milling ("IM") or a magnetorheological finish ("MRF") polishing, to achieve relatively high optical quality surfaces. These additional procedures can be time consuming and can add significant cost. Moreover, polishing a soft resin surface can be challenging and can be complicated, especially when particle fillers are involved. In addition, these secondary processes may lead to systems with reduced stability.

BRIEF DESCRIPTION

The embodiments described herein provide a fabrication assembly and methods that can facilitate the fabrication of mirrors by having substantially net replication without the need for secondary polishing. For example, in some embodiments, a fabrication assembly is provided. The fabrication assembly includes a first deposition apparatus that is configured to receive a composite substrate and to receive a glass substrate that includes a surface with a release coating layer. The first deposition apparatus is also configured to deposit a resin layer between the composite substrate and the glass substrate such that a first portion of the resin layer is positioned adjacent to a surface of the composite substrate and a second portion of the resin layer is positioned adjacent to the surface with the release coating layer of the glass substrate to prevent at least one aperture from forming on the first and second portions of the resin layer. The first deposition apparatus is configured to conduct a first curing of the resin layer using electromagnetic radiation for a predefined period of time. A post-processing chamber is coupled to the first deposition apparatus, wherein the post-processing chamber is configured to receive the resin layer positioned between the composite substrate and the glass substrate and to conduct a second curing of the resin layer. The post-processing chamber is configured to release the resin layer attached to the composite substrate from the glass substrate. A second deposition apparatus is coupled to the post-processing chamber, wherein the second deposition apparatus is configured to receive the resin layer attached to the composite substrate and to deposit a metallic coating onto at least a portion of the resin layer attached to the composite substrate to form a composite mirror object.

In other embodiments, a method of fabricating a composite mirror object is provided. A composite substrate is formed and a glass substrate that includes a surface with a release coating layer is formed. A resin layer is deposited between the composite substrate and the glass substrate such that a first portion of the resin layer is positioned adjacent to a surface of the composite substrate and a second portion of the resin layer is positioned adjacent to the surface with the release coating layer of the glass substrate to prevent at least one aperture from forming on the first and second portions of the resin layer. A first curing of the resin layer is conducted using electromagnetic radiation for a predefined period of time and a second curing of the resin layer is also conducted. The resin layer attached to the composite substrate is released from the glass substrate. A metallic coating is deposited onto at least a portion of the resin layer attached to the composite substrate to form a composite mirror object.

In some embodiments, a fabrication assembly is provided that includes a pressure vessel with at least one portion configured to combine at least one matrix material and at least one fiber material between a first steel substrate and a second steel substrate to generate a composite substrate. A treatment chamber is coupled to said pressure vessel, wherein said treatment chamber is configured to receive the composite substrate and to activate at least a portion of the composite substrate. A first deposition apparatus is coupled to the treatment chamber, wherein the first deposition chamber is configured to receive the composite substrate and to receive a glass substrate that includes a release coating layer. The first deposition apparatus is also configured to deposit a resin layer between the composite substrate and the glass substrate such that a first portion of the resin layer is positioned adjacent to a surface of the composite substrate and a second portion of the resin layer is positioned adjacent to the surface with the release coating layer of the glass substrate to prevent at least one aperture from forming on the first and second portions of the resin layer. The first deposition apparatus is configured to conduct a curing of the resin layer using electromagnetic radiation for a predefined period of time. A post-processing chamber is coupled to the deposition apparatus, wherein the post-processing chamber is configured to receive the resin layer positioned between the composite substrate and the glass substrate. The post-processing chamber is configured to conduct further curing of the resin layer and to release the resin layer attached to the composite substrate from the glass substrate. A second deposition apparatus is coupled to the post-processing chamber, wherein the second deposition apparatus is configured to receive the resin layer attached to the composite substrate and to deposit a metallic coating onto at least a portion of the resin layer attached to the composite substrate to form a composite mirror object.

DETAILED DESCRIPTION

Figure 1:
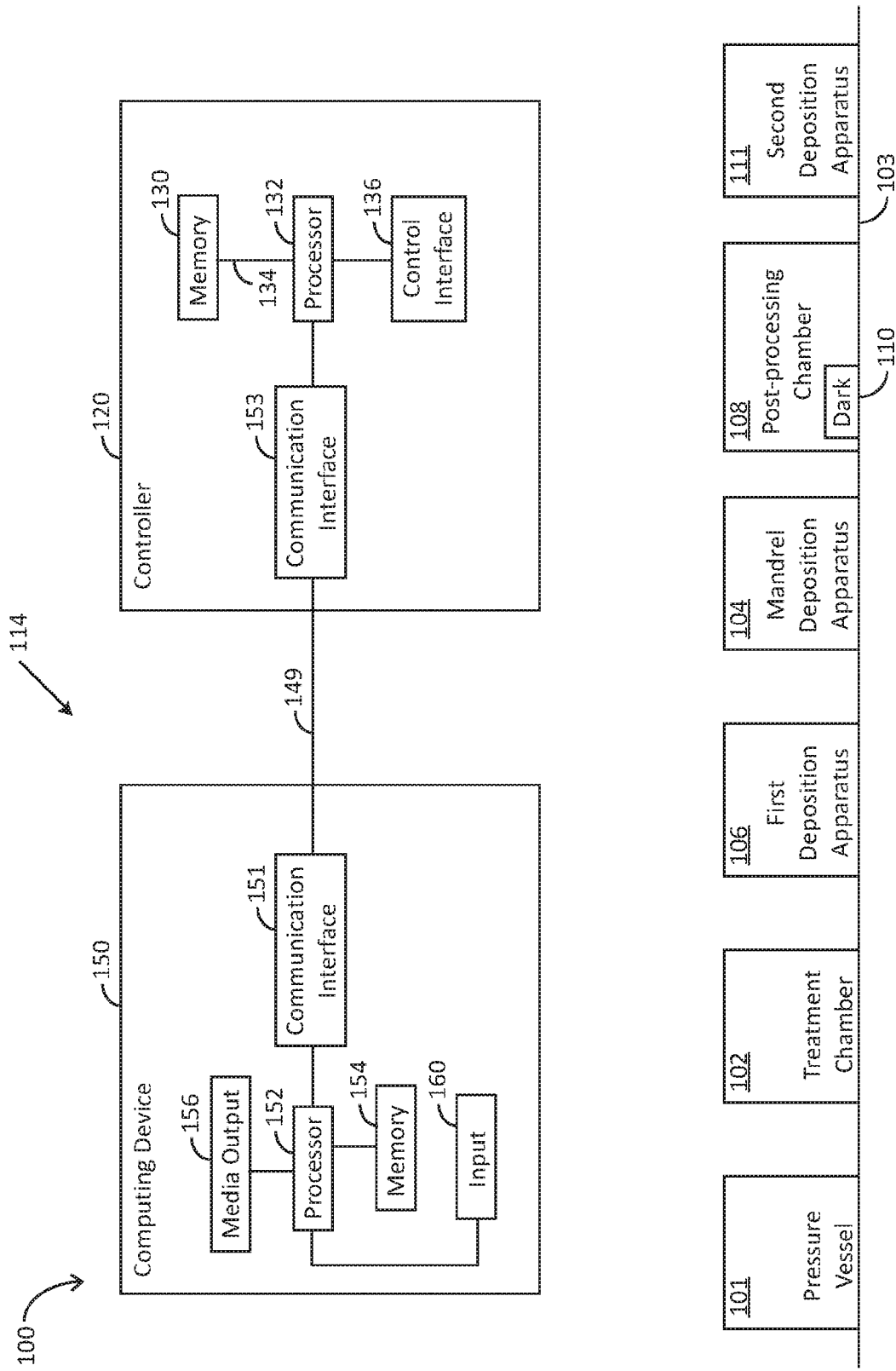
FIG. 1 is an exemplary fabrication assembly in accordance with some embodiments of the present disclosure.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

This description of the exemplary embodiments is intended to be read in connection with the accompanying drawings, which are to be considered part of the entire written description. The drawings are not drawn to scale. In the various drawings, like reference numerals indicate like items, unless expressly indicated otherwise in the text.

As described above, the methods and techniques used for the fabrication of replicated mirrors can be time-consuming and challenging. For example, the methods can require additional procedures, such as a series of secondary polishing procedures, to achieve relatively high optical quality surfaces. Not only can these additional procedures be time consuming, but they can add significant cost. Moreover, polishing a soft resin surface can be challenging and can be complicated, especially when particle fillers are involved. These secondary processes can also lead to systems with reduced stability. The embodiments described herein facilitate the fabrication of mirror object and near net replication without the need for such secondary polishing. The embodiments described herein incorporate the application of a release agent, such as a nanometer scale organic monolayer release agent, as well as a systematic post cure thermal treatment of a resin that has been cured with electromagnetic radiation, such as ultraviolet ("UV") radiation. Additionally, the embodiments herein provide processes to inhibit voids, abnormalities, and/or apertures during curing.

FIG. 1 illustrates a fabrication assembly 100 that can be used to fabricate mirrors or mirror objects. In some embodiments, fabrication assembly 100 includes a pressure vessel 101 that is configured to generate a composite substrate (not shown in FIG. 1), as explained in more detail with respect to FIG. 2. For example, in some embodiments, pressure vessel 101 can be any suitable autoclave used to conduct various processes that require elevated temperature and pressure levels that can be different from ambient air pressure. A treatment chamber 102 is coupled to and/or positioned adjacent to pressure vessel 101 via, for example, a conveyor 103. It should be noted that, as used herein, the term "couple" is not limited to a direct mechanical, communication, and/or an electrical connection between components, but may also include an indirect mechanical, communication, and/or electrical connection between two or more components or a coupling that is operative through intermediate elements or spaces. In some embodiments, treatment chamber 102 includes a vacuum (not shown) and is configured to perform a plasma treatment to activate the composite substrate.

Figure 2:
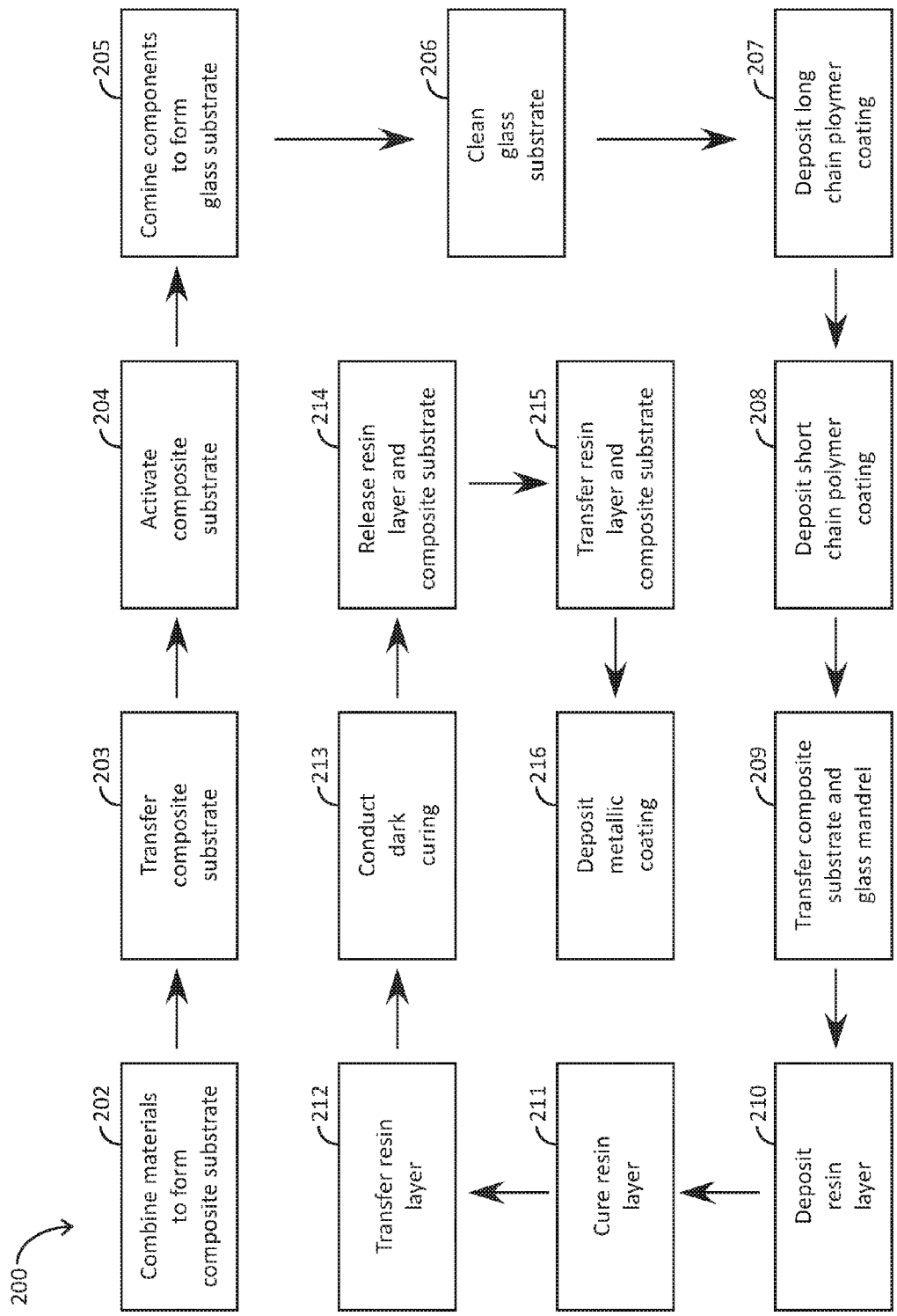
FIG. 2 is a flow diagram of an exemplary method for fabricating composite mirror objects using the fabrication assembly shown in FIG. 1, in accordance with some embodiments of the present disclosure.

In some embodiments, a mandrel deposition apparatus 104 is positioned proximate to treatment chamber 102 and is configured to generate a glass substrate (not shown in FIG. 1), such as a glass mandrel, as explained in more detail with respect to FIG. 2. In some embodiments, treatment chamber 102 includes a suitable sonication device (not shown) and includes one or more solutions therein to treat the glass substrate. Mandrel deposition apparatus 104, in some embodiments, is also configured to deposit one or more coatings onto the glass substrate using the solutions contained therein, as explained in more detail with respect to FIG. 2.

A first deposition apparatus 106 is coupled to and/or positioned adjacent to both treatment chamber 102 and mandrel deposition apparatus 104, via conveyor 103. In some embodiments, first deposition apparatus 106 is configured to receive the composite substrate and the glass substrate, and to deposit a resin layer (not shown in FIG. 1) between the composite substrate and the glass substrate. First deposition apparatus 106, in some embodiments, includes atmospheric plasma therein such that first deposition apparatus 106 is configured to conduct a curing of the resin layer with electromagnetic radiation, such as UV radiation. Alternatively, in some embodiments, first deposition apparatus 106 includes a vacuum (not shown) and UV lights to conduct the curing of the resin layer.

In some embodiments, a post-processing chamber 108 is coupled to and/or positioned adjacent to first deposition apparatus 106. Post-processing chamber 108, in some embodiments, includes a dark chamber 110 therein to enable conducting a second curing of the resin layer. Post-processing chamber 108 also includes a suitable release fixture (not shown) to facilitate releasing the resin layer attached to the composite substrate from the glass substrate.

A second deposition apparatus 111 is coupled to and/or positioned adjacent to post-processing chamber 108. In some embodiments, second deposition apparatus 111 includes a metallic solution therein such that second deposition apparatus 111 is configured to deposit a metallic coating onto at least a portion of the resin layer attached to the composite substrate to form a composite mirror or mirror object (not shown in FIG. 1).

In some embodiments, a control system 114 is coupled to pressure vessel 101, treatment chamber 102, mandrel deposition apparatus 104, first deposition apparatus 106, post-processing chamber 108, and/or second deposition apparatus 111. For example, control system 114 can be configured to control various operational parameters, such as temperature and pressure, within pressure vessel 101, treatment chamber 102, mandrel deposition apparatus 104, first deposition apparatus 106, post-processing chamber 108, and/or second deposition apparatus 111. In some embodiments, control system 114 includes a controller 120 that is operatively coupled to vary the operation of pressure vessel 101, treatment chamber 102, mandrel deposition apparatus 104, first deposition apparatus 106, post-processing chamber 108, and/or second deposition apparatus 111 as a function of values determined from sensors (not shown) responsive to parameters such as temperature and pressure, as well as rates of change of such parameters, according to a programmed control scheme or algorithm. In some embodiments, controller 120 is enabled to facilitate operative features of each of the valves, via features that include, without limitation, receiving inputs, transmitting outputs, and transmitting opening and closing commands. For example, controller 120 is enabled to independently control the pressure within each of pressure vessel 101, treatment chamber 102, mandrel deposition apparatus 104, first deposition apparatus 106, post-processing chamber 108, and/or second deposition apparatus 111.

In some embodiments, controller 120 can be a real-time controller and can include any suitable processor-based or microprocessor-based system, such as a computer system, that includes microcontrollers, reduced instruction set circuits ("RISC"), application-specific integrated circuits ("ASICs"), logic circuits, and/or any other circuit or processor that is capable of executing the functions described herein. In some embodiments, controller 120 can be a microprocessor that includes read-only memory ("ROM") and/or random access memory ("RAM"), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that can be selected based on the importance of the outcome and/or the capability of the system processing the inputs to generate the outcome.

In some embodiments, controller 120 includes a memory device 130 that stores executable instructions and/or one or more operating parameters representing and/or indicating an operating condition of pressure vessel 101, treatment chamber 102, mandrel deposition apparatus 104, first deposition apparatus 106, post-processing chamber 108, and/or second deposition apparatus 111. Controller 120 also includes a processor 132 that is coupled to memory device 130 via a system bus 134. In some embodiments, processor 132 can include a processing unit, such as, without limitation, an integrated circuit ("IC"), an application specific integrated circuit ("ASIC"), a microcomputer, a programmable logic controller ("PLC"), and/or any other programmable circuit. Alternatively, processor 132 can include multiple processing units (e.g., in a multi-core configuration). The above examples are exemplary only, and thus are not intended to limit in any way the definition and/or meaning of the term "processor."

Moreover, in some embodiments, controller 120 includes a control interface 136 that is configured to couple to pressure vessel 101, treatment chamber 102, mandrel deposition apparatus 104, first deposition apparatus 106, post-processing chamber 108, and/or second deposition apparatus 111. More specifically, control interface 136 is coupled to components, such as valves (not shown) within pressure vessel 101, treatment chamber 102, mandrel deposition apparatus 104, first deposition apparatus 106, post-processing chamber 108, and/or second deposition apparatus 111, and control interface 136 is configured to control an operation of the valves. For example, processor 132 can be programmed to generate one or more control parameters that are transmitted to control interface 136. Control interface 136 can then transmit a control parameter to modulate, open, or close the valves, for example.

Various connections are available between control interface 136 and pressure vessel 101, treatment chamber 102, mandrel deposition apparatus 104, first deposition apparatus 106, post-processing chamber 108, and/or second deposition apparatus 111. Such connections can include, without limitation, an electrical conductor, a low-level serial data connection, such as Recommended Standard ("RS") 232 or RS-485, a high-level serial data connection, such as USB, a field bus, a PROFIBUS®, or Institute of Electrical and Electronics Engineers ("IEEE") 1394 (a/k/a FIREWIRE), a parallel data connection, such as IEEE 1284 or IEEE 488, a short-range wireless communication channel (personal area network) such as BLUETOOTH, and/or a private (e.g., inaccessible outside system 100) network connection, whether wired or wireless. PROFIBUS is a registered trademark of Profibus Trade Organization of Scottsdale, Ariz. IEEE is a registered trademark of the Institute of Electrical and Electronics Engineers, Inc., of New York, N.Y. BLUETOOTH is a registered trademark of Bluetooth SIG, Inc. of Kirkland, Wash.

In some embodiments, control system 114 can also include a user computing device 150 that is coupled to controller 120 via a network 149. For example, computing device 150 can be a desktop or laptop computer that includes a communication interface 151 that is coupled to a communication interface 153 contained within controller 120. User computing device 150 includes a processor 152 for executing instructions. In some embodiments, executable instructions are stored in a memory device 154. Processor 152 can include one or more processing units (e.g., in a multi-core configuration). Memory device 154 is any device allowing information, such as executable instructions and/or other data, to be stored and retrieved. User computing device 150 also includes at least one media output component 156 for use in presenting information to a user. Media output component 156 is any component capable of conveying information to the user. Media output component 156 can include, without limitation, a display device (not shown) (e.g., a liquid crystal display (LCD), an organic light emitting diode (OLED) display, or an audio output device (e.g., a speaker or headphones)).

Moreover, in some embodiments, user computing device 150 includes an input interface 160 for receiving input from a user. Input interface 160 can include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, can function as both an output device of media output component 156 and input interface 160.

During operation, fabrication assembly 100 enables the fabrication of mirrors without the need for secondary polishing. For example, as explained in more detail below with respect to FIG. 2, pressure vessel 101 is used to generate the composite substrate by combining at least one matrix material and at least one fiber material between two steel substrates. Treatment chamber 102 activates at least a portion of the composite substrate, such as via plasma treatment. The glass mandrel with a given optical quality can be prepared via mandrel deposition apparatus 104. For example, as explained in more detail below with respect to FIG. 2, a plurality of optical flat components can be combined to generate the glass substrate. Then a long chain polymer coating can be deposited onto at least a portion of the glass substrate to form a release coating layer (not shown in FIG. 1). A short chain polymer coating can be deposited onto at least a portion of the glass substrate to adjust any defective elements in the release coating layer, such as filling any holes in the release coating layer.

Each of the composite substrate and the glass substrate can be transferred to first deposition apparatus 106, wherein the resin layer is deposited between the composite substrate and the glass substrate such that a first portion (not shown in FIG. 1) of the resin layer is positioned adjacent to a surface (not shown in FIG. 1) of the composite substrate and a second portion (not shown in FIG. 1) of the resin layer is positioned adjacent to a surface (not shown) with the release coating of the glass substrate to prevent aperture(s) from forming on the first and second portions of the resin layer. The resin layer is cured using electromagnetic radiation for a predefined period of time. Post-processing chamber 108 conducts further curing of the resin layer and the resin layer and composite substrate are released from the glass substrate. Second deposition apparatus 111 deposits a metallic coating onto at least a portion of the resin layer attached to the composite substrate to form a composite mirror or mirror object (not shown in FIG. 1).

Figure 3A:
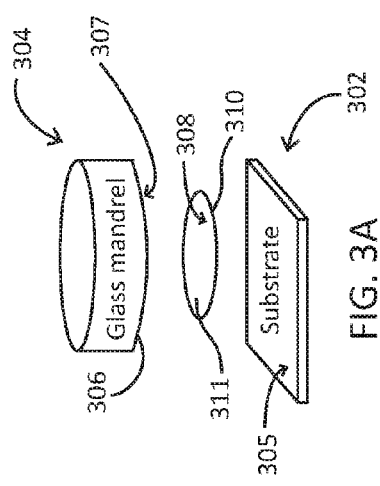
FIGS. 3A to 3C are block diagrams of exemplary substructures used in the fabrication of composite mirror objects using the fabrication assembly shown in FIG. 1, in accordance with some embodiments of the present disclosure.
Figure 3B:
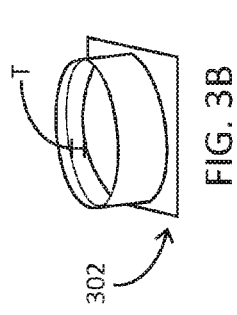
Figure 3C:
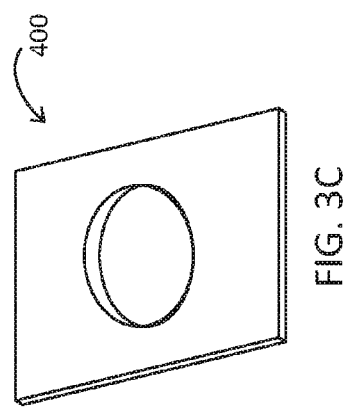

FIG. 2 is a flow diagram 200 of an exemplary method for fabricating a composite mirror or mirror object using a fabrication assembly, such as fabrication assembly 100 (shown in FIG. 1). FIGS. 3A and 3B illustrate an exemplary composite substrate 302 and an exemplary glass mandrel 304 that are used to fabricate a composite mirror. FIG. 3C illustrates an exemplary composite mirror 400 that is generated using the method shown in diagram 200.

Referring to FIG. 2, in step 202, at least one matrix material and at least one fiber material are combined between two steel substrates to generate a mirror composite substrate, such as mirror composite substrate 302 (shown in FIGS. 3A and 3B), in pressure vessel 101 (shown in FIG. 1). In some embodiments, mirror composite substrate 302 can be manufactured in a known quasi-isotropic lay-up, wherein the matrix material is a low moisture absorbing matrix material, such as less than approximately 0.5%, and the fiber material is a high modulus fiber, such as greater than 80 Msi. Composite substrate 302 can be manufactured between a pair of highly polished steel substrates (caul and mandrel) to enable proper as-is surface roughness of approximately less than 1 μm rms and a flatness of approximately 20 μm over approximately 5 inches.

In step 203, composite substrate 302 is transferred from pressure vessel 101 to treatment chamber 102 (shown in FIG. 1). In step 204, at least a portion of composite substrate 302 is activated. For example, in some embodiments, a surface, such as surface 305 (shown in FIGS. 3A and 3B), can be plasma treated to improve wetting and promote bonding without adversely affecting the finish on surface 305.

At the same time or after composite substrate 302 is generated, a glass substrate, such as glass mandrel 304 (shown in FIGS. 3A and 3B) can be generated in mandrel deposition apparatus 104 (shown in FIG. 1). For example, a plurality of optical flat components (not shown) can be combined to generate glass mandrel 304 in step 205. In some embodiments, after glass mandrel 304 is formed, glass mandrel 304 can be cleaned in step 206. For example, glass mandrel 304 can be cleaned by sonication in acetone, followed by sonication in IPA. Glass mandrel 304 can then be dried by performing a nitrogen gas blow off. In some embodiments, glass mandrel 304 can be treated with oxygen gas and plasma for approximately thirty minutes. In some embodiments, glass mandrel 304 can be cleaned by using the systems and methods described in co-pending U.S. patent application Ser. No. 15/016,118 entitled DEPOSITION ASSEMBLY AND METHODS FOR DEPOSITING MOLD RELEASE LAYERS ON SUBSTRATES filed Feb. 4, 2016, which is incorporated herein by reference in its entirety.

In step 207, a long chain polymer coating is deposited onto at least a portion of glass mandrel 304 to form a release coating layer 306 (shown in FIGS. 3A and 3B). For example, in some embodiments, glass mandrel 304 can be immersed in a freshly prepared solution that includes a long chain perfluoropolyether ("PFPE") with a triethoxysilane terminal group (chain length approximately 15 nm). In some embodiments, glass mandrel 304 can be soaked in the solution for approximately an hour to establish release coating layer 306. Then mandrel 304 can be sonicated for approximately ten minutes to help increase the order and density of release coating layer 306. In some embodiments, another on hour soak is utilized to enable the terminal groups to react with, for example, a surface 307 of glass mandrel 304.

In step 208, a short chain polymer coating is deposited onto at least a portion of the glass substrate to adjust any defective elements in release coating layer 306, such as filling any holes in release coating layer 306. For example, in some embodiments, glass mandrel 304 is removed from the solution used in step 207 and immediately immersed into a solution that includes short chain fluorocarbon with a triethoxysilane terminal group (chain length approximately 1 nm). Once in this solution, glass mandrel 304 can be sonicated for approximately ten minutes to facilitate diffusion of the smaller molecules through release coating layer 306 and displace any weakly adsorbed molecules and fill in any micro-scale holes. Glass mandrel 304 is soaked for approximately an hour for the freshly infused molecules to chemically bond to, for example, surface 307 and to cross-link. Glass mandrel 304 is removed from this solution and heated at approximately 120° C. for approximately an hour. Steps 207 and 208 facilitate the formation of release coating layer 306 and, in some embodiments, release coating layer 306 can be a self-assembled monolayer ("SAM"). In some embodiments, steps 207 and 208 can be performed by using the systems and methods described in co-pending U.S. patent application Ser. No. 15/016,118 entitled DEPOSITION ASSEMBLY AND METHODS FOR DEPOSITING MOLD RELEASE LAYERS ON SUBSTRATES filed Feb. 4, 2016, which is incorporated herein by reference in its entirety.

In step 209, composite substrate 302 and glass mandrel 304 with release coating layer 306 thereon are each transferred to first deposition apparatus 106 (shown in FIG. 1). In step 210, a resin layer 308 (shown in FIGS. 3A and 3B) is deposited between composite substrate 302 and glass mandrel 304. For example, as shown in FIG. 3A, resin layer 308 can be deposited between composite substrate 302 and glass mandrel 304 such that a first portion 310 of resin layer 308 is positioned adjacent to surface 305 of composite substrate 302 and a second portion 311 of resin layer 308 is positioned adjacent to release coating layer 306 on surface 307 of glass mandrel 304. In some embodiments, resin layer 308 is an uncured UV resin layer that is sandwiched between composite substrate 302 and glass mandrel 304 in a predefined pattern on both composite substrate surface 305 and glass mandrel surface 307 such that apertures are prevented from being formed on first portion 310 and second portion 311 of resin layer 308. As shown in FIG. 3B, resin layer 308 is spread between composite substrate 302 and glass mandrel 304 to a desired thickness (T). In some embodiments, the bondline thickness can be controlled by stainless steel shims (not shown).

Referring to FIG. 2, in step 211, resin layer 308 is cured using electromagnetic radiation for a predefined period of time. For example, in some embodiments, resin layer 308 is cured with UV exposure for a predefined duration. The UV exposure can be provided using atmospheric plasma and/or within a vacuum chamber in first deposition apparatus 106 with one or more UV lamps.

In step 212, resin layer 308 attached to composite substrate 302 and glass mandrel 304 is transferred to post-processing chamber 108 (shown in FIG. 1). In step 213, dark curing of resin layer 308 is conducted. In step 214, resin layer 308 and composite substrate 302 are released from glass mandrel 304. In some embodiments, resin layer 308 and composite substrate 302 can be released using, for example, a suitable screw driver type instrument or a micrometer to push away glass mandrel 304 from resin layer 308 and composite substrate 302 so that resin layer 308 is now a replicated resin layer. Such instruments can impart a peel stress and produce a relatively lower load on replicated resin layer 308 that can inhibit small abnormalities or deformations from forming. In some embodiments, the surface of resin layer 308 can be verified or inspected using suitable techniques, such as Zygo interferometry.

In step 215, resin layer 308 attached to composite substrate 302 is transferred to second deposition apparatus 111 (shown in FIG. 1). In step 216, a metallic coating is deposited onto at least a portion of resin layer 308 attached to composite substrate 302 to form a composite mirror or mirror object, such as composite mirror 400 (shown in FIG. 3C). In some embodiments, the metallic coating can be a suitable reflective metal film.

Exemplary embodiments of the assemblies, systems, and methods are described above in detail. The assemblies, systems, and methods are not limited to the specific embodiments described herein, but rather, components of the assemblies, systems and/or steps of the method may be utilized independently and separately from other components and/or steps described herein. For example, embodiments of the deposition assembly and system may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fabrication assembly comprising:
   a first deposition apparatus configured to:
   receive a composite substrate;
   receive a glass substrate that includes a surface with a release coating layer;
   deposit a resin layer between the composite substrate and the glass substrate such that a first portion of the resin layer is positioned adjacent to a surface of the composite substrate and a second portion of the resin layer is positioned adjacent to the surface with the release coating layer of the glass substrate to prevent at least one aperture from forming on the first and second portions of the resin layer; and
   conduct a first curing of the resin layer using electromagnetic radiation for a predefined period of time;
   a post-processing chamber coupled to said first deposition apparatus, wherein said post-processing chamber is configured to:
   receive the resin layer positioned between the composite substrate and the glass substrate;
   conduct a second curing of the resin layer; and
   release the resin layer attached to the composite substrate from the glass substrate; and
   a second deposition apparatus coupled to said post-processing chamber, wherein said second deposition apparatus is configured to receive the resin layer attached to the composite substrate and to deposit a metallic coating onto at least a portion of the resin layer attached to the composite substrate to form a composite mirror object.

2. The fabrication assembly of claim 1, wherein the resin layer includes an ultraviolet resin layer.

3. The fabrication assembly of claim 1, wherein said first deposition apparatus is configured to facilitate a spreading of the resin layer between the composite substrate and the glass substrate.

4. The fabrication assembly of claim 1, further comprising a pressure vessel coupled to said first deposition apparatus, wherein said pressure vessel is configured to combine at least one matrix material and at least one fiber material between a first steel substrate and a second steel substrate to generate the composite substrate.

5. The fabrication assembly of claim 4, further comprising a treatment chamber coupled to said pressure vessel and to said first deposition apparatus, wherein said treatment chamber is configured to receive the composite substrate and to activate at least a portion of the composite substrate.

6. The fabrication assembly of claim 5, wherein said treatment chamber is configured to activate at least a portion of the composite substrate using a plasma treatment.

7. The fabrication assembly of claim 1, further comprising a third deposition apparatus coupled to said first deposition apparatus, wherein said third deposition apparatus is configured to:
   combine a plurality of optical flat components to generate the glass substrate;
   deposit a first coating on at least a portion of the glass substrate, wherein the first coating includes a long chain polymer coating to form the release coating layer; and
   deposit a second coating on at least a portion of the glass substrate, wherein the second coating includes a short chain polymer coating to adjust at least one defective element in the release coating layer.

8. A fabrication assembly comprising:
   a pressure vessel comprising at least one portion configured to combine at least one matrix material and at least one fiber material between a first steel substrate and a second steel substrate to generate a composite substrate;
   a treatment chamber coupled to said pressure vessel, wherein said treatment chamber is configured to receive the composite substrate and to activate at least a portion of the composite substrate;
   a first deposition apparatus coupled to said treatment chamber, wherein said first deposition apparatus is configured to:
   receive the composite substrate;
   receive a glass substrate that includes a release coating layer;
   deposit a resin layer between the composite substrate and the glass substrate such that a first portion of the resin layer is positioned adjacent to a surface of the composite substrate and a second portion of the resin layer is positioned adjacent to the surface with the release coating layer of the glass substrate to prevent at least one aperture from forming on the first and second portions of the resin layer; and conduct a curing of the resin layer using electromagnetic radiation for a predefined period of time;

a post-processing chamber coupled to said deposition apparatus, wherein said post-processing chamber is configured to:

receive the resin layer positioned between the composite substrate and the glass substrate;

conduct further curing of the resin layer; and release the resin layer attached to the composite substrate from the glass substrate; and a second deposition apparatus coupled to said post-processing chamber, wherein said second deposition apparatus is configured to receive the resin layer attached to the composite substrate and to deposit a metallic coating onto at least a portion of the resin layer attached to the composite substrate to form a composite mirror object.

9. The fabrication assembly of claim 8, wherein the resin layer includes an ultraviolet resin layer.

10. The fabrication assembly of claim 8, wherein said first deposition apparatus is configured to facilitate a spreading of the resin layer between the composite substrate and the glass substrate.

11. The fabrication assembly of claim 8, further comprising a third deposition apparatus coupled to said first deposition apparatus, wherein said third deposition apparatus is configured to:

combine a plurality of optical flat components to generate the glass substrate;

deposit a first coating on at least a portion of the glass substrate, wherein the first coating includes a long chain polymer coating to form the release coating layer; and deposit a second coating on at least a portion of the glass substrate, wherein the second coating includes a short chain polymer coating to adjust at least one defective element in the release coating layer.

* * * * *